(12) United States Patent
Patenaude

(10) Patent No.: US 8,149,872 B2
(45) Date of Patent: *Apr. 3, 2012

(54) MULTI-SERVICE ETHERNET-OVER-SONET SILICON PLATFORM

(75) Inventor: Jean-Marc Guy Patenaude, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/796,257

(22) Filed: Jun. 8, 2010

(65) Prior Publication Data

US 2010/0265963 A1 Oct. 21, 2010

Related U.S. Application Data

(63) Continuation of application No. 10/318,444, filed on Dec. 13, 2002, now Pat. No. 7,733,900.

(60) Provisional application No. 60/419,865, filed on Oct. 21, 2002.

(51) Int. Cl.
*H04J 3/16* (2006.01)
(52) U.S. Cl. ...................................... 370/466
(58) Field of Classification Search .................. 370/406, 370/465, 466, 473
See application file for complete search history.

(56) References Cited

U.S. PATENT DOCUMENTS

| | | | |
|---|---|---|---|
| 4,967,405 A | 10/1990 | Upp et al. | |
| 4,998,242 A | 3/1991 | Upp | |
| 5,003,463 A | 3/1991 | Coyle et al. | |
| 5,040,170 A | 8/1991 | Upp et al. | |
| 5,161,160 A | 11/1992 | Yaguchi et al. | |
| 6,047,002 A | 4/2000 | Hartmann et al. | |
| 6,122,281 A | 9/2000 | Donovan et al. | |
| 6,222,848 B1 * | 4/2001 | Hayward et al. ............... | 370/412 |
| 6,246,702 B1 | 6/2001 | Fellman et al. | |
| 6,385,209 B1 | 5/2002 | Skirmont et al. | |
| 6,414,966 B1 | 7/2002 | Kulkarni et al. | |
| 6,532,215 B1 * | 3/2003 | Muntz ........................... | 370/242 |
| 6,925,494 B1 * | 8/2005 | Nisbet ........................... | 709/223 |
| 6,944,190 B1 * | 9/2005 | Tomar et al. .................. | 370/535 |
| 6,993,046 B1 | 1/2006 | Hernandez-Valencia et al. | |
| 6,996,125 B2 | 2/2006 | Kfir et al. | |

(Continued)

FOREIGN PATENT DOCUMENTS

EP 0982969 A 3/2000

(Continued)

OTHER PUBLICATIONS

European Search Report, EP 03 02 344, Feb. 20, 2006, 4 pages.

*Primary Examiner* — Derrick Ferris
*Assistant Examiner* — Mohammad Anwar
(74) *Attorney, Agent, or Firm* — Brinks Hofer Gilson & Lione

(57) ABSTRACT

An integrated circuit device for use in connecting synchronous optical networks to packet networks and synchronous time division multiplexed subscriber lines and a method of operation of same is disclosed. An embodiment of the invention may include SONET/SDH compatible optical carrier framing, cross connect, and packet mapping functionality. In addition, it may support Ethernet packet network connections and DS1/E1 and DS3/E3 time division multiplexed subscriber circuits, and may include a telecom bus compatible interface for the connection of additional communications devices. An embedded microprocessor core and embedded memory may permit the present invention to support enhanced remote diagnostic, trouble reporting, traffic management, and software update capabilities.

28 Claims, 12 Drawing Sheets

U.S. PATENT DOCUMENTS

| | | | |
|---|---|---|---|
| 7,031,256 B2 | 4/2006 | Hamlin et al. | |
| 7,031,341 B2 * | 4/2006 | Yu | 370/469 |
| 7,042,904 B2 | 5/2006 | Kamiya | |
| 7,173,936 B1 | 2/2007 | Semaan | |
| 7,733,900 B2 * | 6/2010 | Patenaude | 370/466 |
| 2003/0058888 A1 * | 3/2003 | Shinoda | 370/470 |
| 2003/0067928 A1 | 4/2003 | Gonda | |
| 2004/0076175 A1 | 4/2004 | Patenaude | |

FOREIGN PATENT DOCUMENTS

| | | |
|---|---|---|
| EP | 1091529 A | 4/2001 |
| EP | 1124355 A | 8/2001 |
| WO | WO0074282 A | 12/2000 |

\* cited by examiner

|     |                 |
|-----|-----------------|
| 510 | PROCESSOR CARD  |
|     | PROCESSOR CARD  |
| 508 | OC 48           |
|     | OC 48           |
| 506 | OC 12           |
| 504 | SWITCH          |
|     | SWITCH          |
|     | ETHERNET        |
|     | ETHERNET        |
|     | ETHERNET        |
|     | ETHERNET        |
| 502 | ETHERNET        |
|     | XDSL TO ETHERNET|

FIG. 5
(PRIOR ART)

MULTI-SERVICE ETHERNET-OVER-SONET SILICON PLATFORM

CROSS-REFERENCE TO RELATED APPLICATIONS/INCORPORATION BY REFERENCE

The present application is a continuation of U.S. patent application Ser. No. 10/318,444, entitled "MULTI-SERVICE ETHERNET-OVER-SONET SILICON PLATFORM", filed Dec. 13, 2002, now U.S. Pat. No. 7,733,900, issued Jun. 8, 2010, which makes reference to, claims priority to, and claims the benefit of U.S. Provisional Application Ser. No. 60/419,865, "MULTI-SERVICE ETHERNET-OVER-SONET SILICON PLATFORM", filed Oct. 21, 2002. The complete subject matter of each of the above applications are hereby incorporated herein by reference, in their respective entirety. With respect to the present application, Applicant hereby rescinds any disclaimer of claim scope made in the parent application or any predecessor or related application. The Examiner is advised that any previous disclaimer of claim scope, if any, and the alleged prior art that it was made to allegedly avoid, may need to be revisited. Nor should a disclaimer of claim scope, if any, in the present application be read back into any predecessor or related application.

This application is also related to the following co-pending applications, each of which are herein incorporated by reference:

| Ser. No. | Docket No. | Title | Filed | Inventors |
|---|---|---|---|---|
| 60/420,527 | 14099US01 | Multi-Service Channelized SONET Mapper Framer | Oct. 23, 2002 | Patenaude |

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Certain embodiments of the present invention relate to providing access to broadband communication systems. More specifically, certain embodiments relate to an apparatus which provides an interface to connect to broadband synchronous optical networks in order to provide a variety of synchronous and packet network connections.

In the past, a variety of transmission technologies have been used to electronically transfer large amounts of digital information, including both terrestrial and satellite links. Terrestrial facilities that have commonly been used include both buried and above-ground cable, microwave radio and most recently, optical fiber, which offers the largest bandwidth. Networks used for such high capacity data transport systems are typically synchronous networks.

A synchronous network is one example of what is traditionally referred to as a circuit-switched network. In a synchronous network, data is transmitted from one location to another as a continuous stream of digital information moving from the source to the destination at a constant rate. The stream is organized as a sequence of frames, each frame containing a fixed number of fields in a defined order, each field of the same length. An end-to-end connection or "circuit" in a synchronous network exists as a collection of individual segments which are assigned when the circuit is built or "provisioned". At the time that a circuit is provisioned it is assigned the use of one or more of the fields in the frames exchanged across a given segment, and a circuit may be assigned a different field within the frames carried on different segments. The transfer of data at the point of connection of one segment to another is time synchronized, and does not add significant delay. Because the data on any segment moves at a constant rate, and no delay occurs at the connections between segments, the time needed to travel from one end to the other end of a circuit is fixed. The Synchronous Optical Network (SONET) and Synchronous Digital Hierarchy (SDH) are the principal synchronous optical network standards currently in use. In the SONET standard, the term "circuit" in the above discussion corresponds to the SONET term "path", and the term "segment" corresponds to the SONET term "link". An example of a path in a SONET network is shown in FIG. 1.

In most cases, no single user needs all of the capacity of an optical fiber-based transmission system, so the standards have been designed to provide a means to share the bandwidth. For example, SONET networks typically operate at data rates of between 51.84 megabits per second (Mbps) and 10 gigabits per second (Gbps). Within that range, a device called an add/drop multiplexer (ADM) can be used to insert or extract a lower bit rate stream to or from one of a higher bit rate. A diagram showing the SONET hierarchy and the relationships between bits rates is illustrated in FIG. 2.

In contrast to circuit switched networks, packet networks consist of a mesh of nodes interconnected by links, and data is exchanged in bursts called packets. The use of packet networks is growing in popularity due to the flexibility offered by the ability of a packet network to efficiently handle multiple data streams of widely varying bandwidth. This flexibility is one of the factors helping to bring about a convergence of data and voice networks. The packet contents include the address of its destination, and it is the function of each node to direct each packet that it receives to a link that will send it closer to its destination. In general, a packet is queued at a node before being forwarded to the next node in the path, because it may have to wait for the outgoing link to become available. Packets may contain voice, data, or video information, and can be of varying length. The amount of time that a packet takes to travel from the source to the destination varies based upon a number of factors including the number of nodes, the speed of the links, and the queuing delay that occurred at each node. Each of the services supported on a packet network has its own set of requirements including, for example, end-to-end delay, packet loss, and privacy. Designers of packet networks take those requirements into consideration.

Synchronous optical networks are the primary transport mechanism for long distance transmission of information, and are becoming increasingly important in metropolitan areas. At the same time, the use of packet networks is growing rapidly due to their ability to efficiently carry multiple data streams of widely varying bandwidth. With the passage of time, the number and variety of data services, the number of users, and the total bandwidth required at any particular user location will grow. Some legacy equipment requires lower speed synchronous network connections, while other equipment requires a packet network interface. In some applications, more than one synchronous optical link may be needed to support the total bandwidth required. As user demand for higher bandwidth connections grows and synchronous optical networks expand, support for connections of varying bandwidth will become increasingly important. The result is an ever-growing need for high-capacity, highly-functional, cost-effective systems for the connection of synchronous optical networks to packet networks and to lower speed synchronous networks.

The functionality that may be needed to connect a SONET or SDH synchronous optical network and a packet network includes that of an Add-Drop Multiplexer (ADM) or terminal, a Digital Cross-Connect (DCC), and a Multi-Service Provisioning Platform (MSPP). ADMs are used to transport SONET or SDH traffic on network ring topologies. An example of such a SONET ring is shown in FIG. 3. The most popular of these ring topologies are Unidirectional Protected Switched Rings (UPSR) and Bidirectional Line Switched Rings (BLSR). In this arrangement, the nodes on the ring are linked by two optical fiber connections that transmit data in opposite directions. Should one of the optical fibers experience a failure, the nodes in the ring are still able to communicate using the other optical fiber. The ADMs are nodes on such rings that are used to arbitrate (add or drop) traffic to or from the ring. Rings are interconnected by gateways, as illustrated in FIG. 4. The client traffic on the ADM (the traffic that is added or dropped from the network ring) is normally transmitted at a lesser data rate than the network traffic (the traffic on the ring). Typical ring traffic rates for both SONET and SDH are 155 Mbps, 622 Mbps, 2488 Mbps and 9953 Mbps. These correspond to OC-3, OC-12, OC-48 and OC-192 rates for SONET respectively, and to STM-1, STM-4, STM-16 and STM-64 rates for SDH respectively. Client traffic on the ADM can either be a lower SONET or SDH rate than the ring rate, or it can be a PDH rate (Plesiochronous Digital Hierarchy), such as DS1, DS2 or DS3 or E1, E2 and E3. The DS1 rate is 1.544 Mbps, DS2 is 6.312 Mbps, DS3 is 44.736 Mbps, E1 is 2.048 Mbps, E2 is 8.448 Mbps, and E3 is 34.368 Mbps.

A SONET/SDH terminal performs a function similar to that of an ADM except that the network connection is not in a ring configuration. A terminal terminates a high speed point-to-point SONET path, and hands off a number of lower rate lines and paths on the client side. For example, an OC-3 terminal could be used to terminate an OC-3 path and hand off three DS3 lines on the client side.

The DCCs are used to switch and groom traffic between different lines and paths. A network may include several ADMs and terminals to arbitrate or terminate traffic along rings or point-to-point connections, and a DCC will be used to switch the traffic between all the paths. A DCC is a circuit switch, which means that all connections are provisioned statically.

The Multi-Service Provisioning platform combines the function of the DCC, the ADM, and the terminal along with the ability to support data protocols such as Ethernet to the client users. In all instances today, these MSPPs are scalable platforms based on a chassis. This means that to build a useful system, a user needs to install a specific circuit card supporting each function. The purpose of the chassis is to hold the required circuit cards, provide an electrical interconnect or "backplane" to connect signals from one card to another, and to supply power for system operation. For example, separate cards are needed for switching, supporting the ADM function, supporting and mapping DS1 traffic, supporting and mapping DS3 traffic, and supporting and mapping Ethernet traffic. FIG. 5 illustrates an example chassis arrangement of an MSPP 500, showing Ethernet interface card 502, cross-point switch card 504, synchronous optical interface cards 506 and 508, and processor card 510. The silicon devices developed to support these platforms tend to implement an ever increasing but still small portion of the needed functionality. For instance, there are devices on the market supporting SONET framing, DS1 framing and mapping, DS3 framing and mapping, DS1 mapping into DS3 (known as M13 mappers), Ethernet-over-SONET mappers, and digital cross-connects. Building a system is complex and costly due to the number of cards and/or individual integrated circuit devices required. The variety and number of network connections that can be supported by the MSPP system is limited by several factors, including the level of functionality and number of connections on each integrated circuit device, the number of circuit cards that can be contained within the chassis, and the number of signals that must be carried by the backplane.

As can be seen from the above discussion, there is a fundamental disconnect between the packet network environment and core optical networks such as SONET and SDH. The relatively high cost of the technology typically used to fill this gap hinders network growth and further expansion of support for metropolitan optical networks. Accordingly there is a need for a more compact, cost-effective, and more flexible solution to providing packet network and time-division-multiplexed type services over SONET and SDH-based optical networks.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Aspects of the present invention relate to a device that permits exchange of information between optical carrier systems and packet networks. More specifically, one embodiment of the present invention may be a single integrated circuit that includes functionality that may be required to allow packet-based and synchronous time division multiplexed data services to be provided via SONET or SDH compatible optical fiber networks.

An embodiment in accordance with the present invention may comprise at least one optical carrier framer for performing transmit framing on a channelized input data stream producing a transmit data stream, and for performing receive framing on a receive data stream producing a channelized output data stream. It may include a cross connect for multiplexing at least one input data channel to form the channelized input data stream, and for de-multiplexing the channelized output data stream into at least one output data channel. The embodiment may also have a packet mapper for packetizing at least one of the at least one output data channel, producing at least one packet output stream, and for de-packetizing at least one packet input stream, producing at least one of the at least one input data channel. In addition, it may include a bus interface for connecting additional communications interface devices, where the bus interface is arranged in order to permit the transfer of data from at least one of the at least one output data channel to an external communications device, and the transfer of data from an external communications device to at least one of the at least one input data channel.

An embodiment of the present invention may format the transmit data stream and the receive data stream of the at least one optical carrier framer to be compatible with the Synchronous Optical Network or Synchronous Digital Hierarchy optical carrier standard. The bus interface may be a telecom bus compatible interface. Another embodiment of the present invention may include at least one T/E carrier framer for receiving and transmitting data in time division multiplexed format, wherein the at least one T/E carrier framer is a DS1 or E1 format framer, or a DS3 or E3 format framer.

In an embodiment of the present invention, the packet format of the packet output stream and packet input stream may be compliant with at least one the Institute of Electrical and Electronic Engineers 802.3 family of Ethernet standards, and the packet mapper may be compatible with the American National Standards Institute T1X1.5 Generic Framing Procedure, the International Telecommunications Union X.86 Ethernet over SONET recommendation, or the Internet Engineering Task Force RFC 1662 point-to-point protocol (PPP) specification.

An embodiment in accordance with the present invention may include at least one embedded microprocessor core arranged to receive signals from the packet mapper. It may have an embedded memory for storing information to be accessed by the at least one embedded microprocessor core, and may include an external memory interface arranged to allow the at least one embedded microprocessor core to access information stored in an external memory device. An Optical Interface Forum System Packet Interface compliant interface is not used in an embodiment of the present invention.

Another aspect of the present invention relates to a method of operating a single chip Ethernet to SONET interface device. One embodiment of such a method may comprise receiving a SONET or SDH compatible data stream, converting the SONET or SDH compatible data stream to a packet stream, transmitting the packet stream, receiving a packet stream, converting the packet stream to a SONET or SDH compatible data stream; and transmitting the SONET or SDH compatible data stream.

A further embodiment of the present invention can be found in a method of operating a single chip Ethernet to SONET interface device, the method comprising channelizing a receive data stream to produce a channelized output data stream, de-multiplexing the channelized output data stream to produce at least one output data channel, packetizing the at least one output data channel to produce a packet output stream, de-packetizing a packet input stream to produce at least one input data channel, multiplexing the at least one input data channel to produce a channelized input data stream, framing the channelized input data stream to produce a transmit data stream, and collecting at least one statistic relating to the execution of the channelizing, de-multiplexing, packetizing, de-packetizing, multiplexing, and framing actions. The formats of the transmit data stream and the receive data stream may be compatible with the Synchronous Optical Network or Synchronous Digital Hierarchy optical carrier standard, and a packet format of the packet output stream and packet input stream may be compliant with at least one of the Institute of Electrical and Electronic Engineers 802.3 family of Ethernet standards. In addition, the multiplexing and de-multiplexing may be compatible with the American National Standards Institute T1X1.5 Generic Framing Procedure, the International Telecommunications Union X.86 Ethernet over SONET recommendation, or the Internet Engineering Task Force RFC 1662 point-to-point protocol specification. The method may include monitoring the receive data stream for at least one predetermined data sequence, where the at least one predetermined data sequence may be a request to accept new software instructions or a request to transmit the at least one statistic in the transmit data stream.

These and other advantages, aspects, and novel features of the present invention, as well as details of illustrated embodiments, thereof, will be more fully understood from the following description and drawings.

BRIEF DESCRIPTION OF SEVERAL VIEWS OF THE DRAWINGS

FIG. 5 is an illustration of the chassis of an exemplary multi-service provisioning platform, showing the arrangement of the individual circuit cards that may be used to support various communications services.

DETAILED DESCRIPTION OF THE INVENTION

Figure 1:
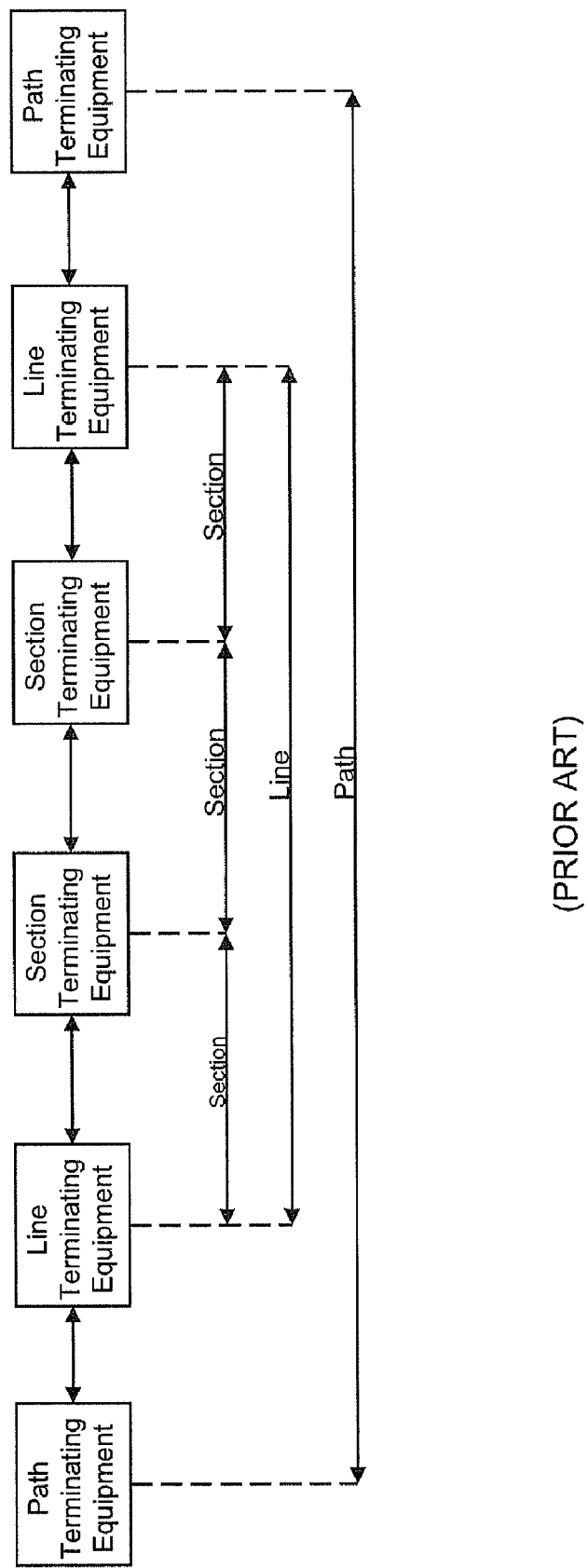
FIG. 1 is a block diagram showing the elements along the path in a SONET network.
Figure 2:
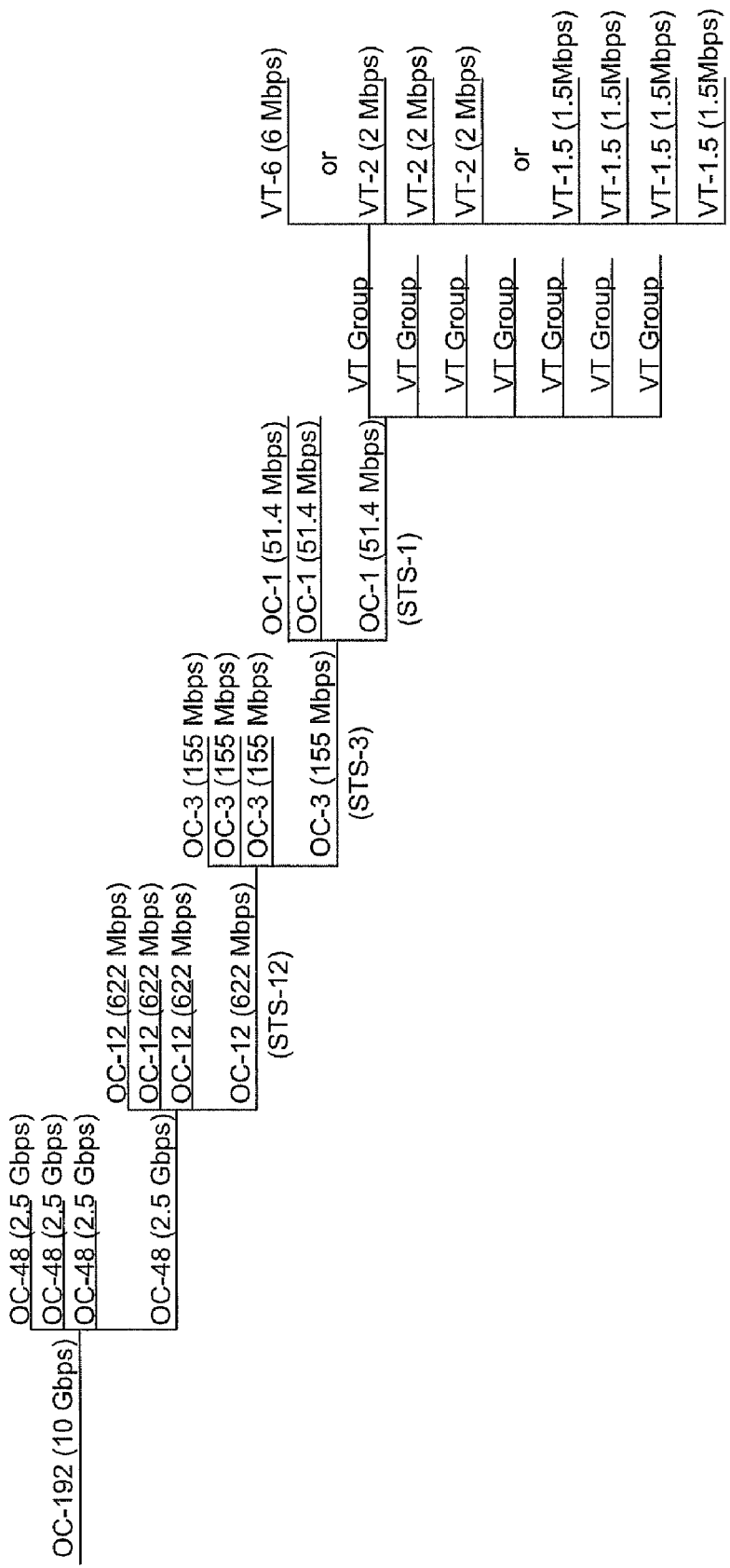
FIG. 2 is a hierarchy diagram showing the names and relationships of the various link capacities available within the SONET hierarchy.
Figure 3:
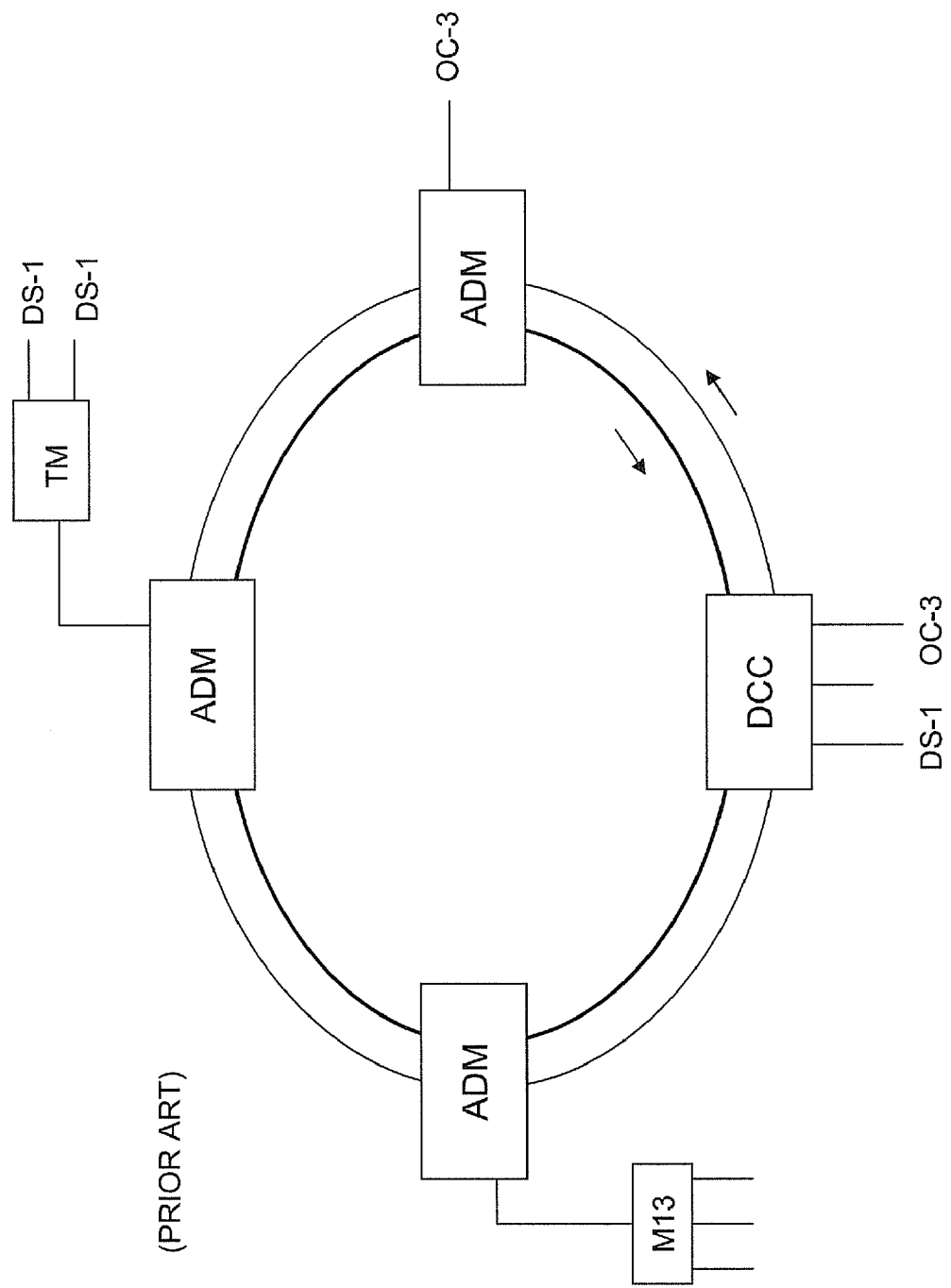
FIG. 3 is a block diagram showing the structure of a exemplary SONET ring, and the elements and interconnections that may be present.
Figure 4:
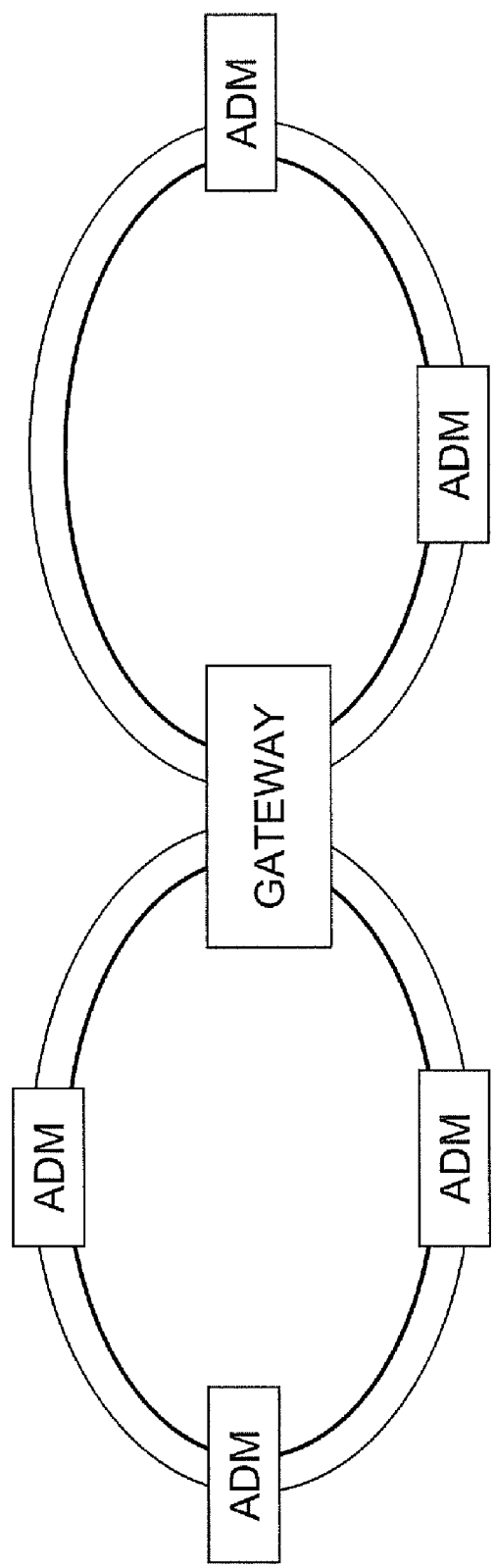
FIG. 4 is a block diagram illustrating an exemplary interconnection of two SONET ring structures, and the gateway which connects them.
Figure 6:
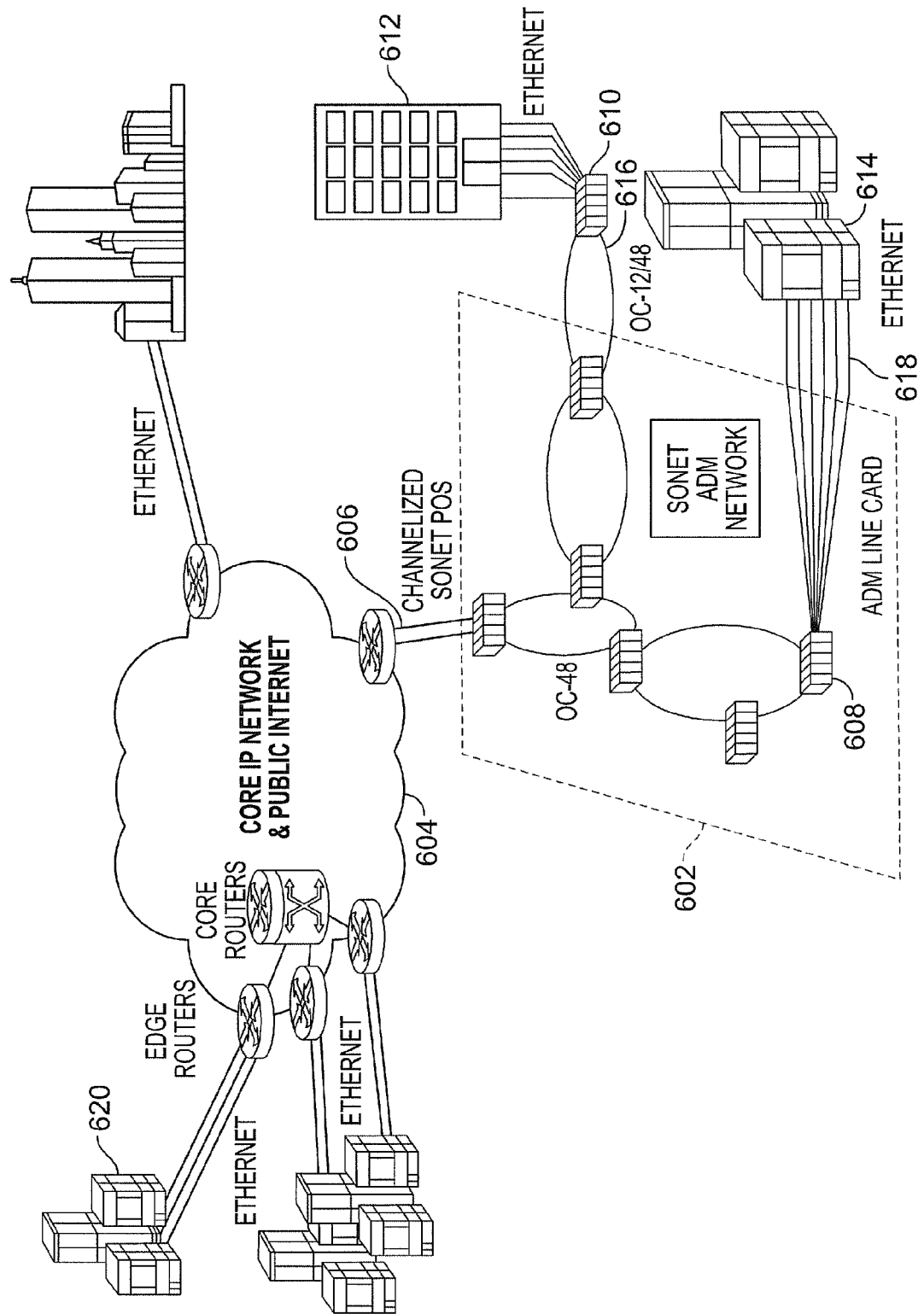
FIG. 6 is network diagram showing an exemplary network configuration in which a SONET network and a packet network are interconnected to provide a variety of services, in accordance with an embodiment of the present invention.

Aspects of the present invention may be seen in FIG. 6, which illustrates the interconnections in an example of a data communications network. As shown in the diagram, portions of the network, such as SONET optical link 606, metropolitan area network connection 616, and SONET ADM Network 602, are synchronous optical network links. Other portions, such as packet connection 618 linking ADM 608 to users 614, and Core IP Network and Public Internet 604, are constructed using a packet network. The fundamental difference in these two forms of data transport may require a means at several points a long the transmission path to adapt packetized data for transmission via a synchronous link, and synchronous data for packet transport. For example, packet data traffic from service provider 620 destined for users 612 may be sent in Ethernet packet format from service provider 620 through Core IP Network 604 and directed onto packet-over-SONET link 606. The broadband traffic may then pass through SONET ADM Network 602 onto metropolitan area network 616 to multi-service provisioning platform 610, where it would be mapped into one or more Ethernet packet connections to users 612. Packets flowing from users 612 back to service provider 620 would require similar data format adjustments. An embodiment of the present invention may provide the functionality needed to allow a broadband synchronous optical network to serve a variety of synchronous and packet network connections in a flexible manner at lower cost than existing alternatives, and may be incorporated into a circuit card in add/drop multiplexer 608. It may also be used to offer Ethernet services in metropolitan markets by leveraging the SONET infrastructure. To support such an application, an embodiment of the present invention may be contained within multi-service provisioning platform 610. In such applications, it may support the use of Ethernet private lines, and advanced Internet protocol (IP) services such as Voice-over-IP (VoIP) telephony. The present invention may also be used to provide advanced remote troubleshooting features on subscriber connections 618.

Figure 7:
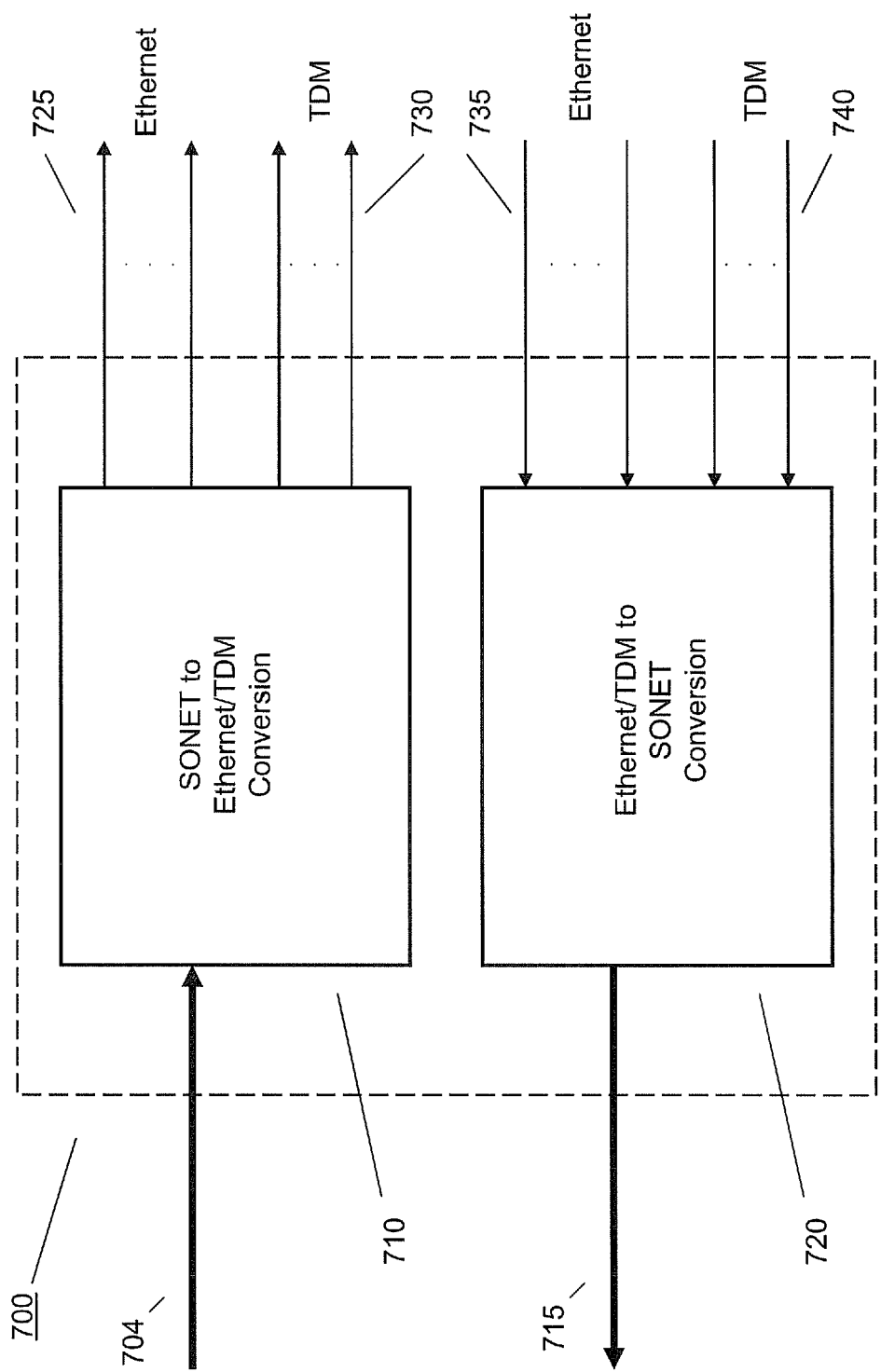
FIG. 7 is a high-level block diagram illustrating a single-chip embodiment of the present invention.

An embodiment of the present invention may combine all of the functionality that may be needed to provide client-side support for a variety of interfaces, including 10 Mbps/100 Mbps and gigabit Ethernet, DS1/E1 and DS3/E3 time-division-multiplexed synchronous links, and network or trunk-side interfaces for one or more synchronous optical links or DS3/E3 time-division-multiplexed synchronous links in a single integrated circuit, or in a multi-chip configuration. A high-level block diagram illustrating an exemplary embodiment of the present invention is shown in FIG. 7. In this embodiment, incoming signals from SONET line 704 are converted by SONET-to-Ethernet/TDM Conversion block 710 into one or more packet streams 725 and one or more TDM data streams 730. In the reverse direction, the functionality of Ethernet/TDM-to-SONET Conversion block 720 receives one or more packet streams 735 and one or more TDM data streams 740, and converts them into a format suitable for transmission via SONET line 715. The functionality shown in FIG. 7 for inclusion in an embodiment of the present invention permits the realization of a single-chip device. For example, it is possible to eliminate the Optical Internetworking Forum System Packet Interface (SPI) typically used to interconnect some of the illustrated functionality. Removing the need for this interface not only frees the chip area that would typically be used for the interface components, it enables an embodiment of the present invention to incorporate a significantly larger number of virtual channel connections between the packet processing and network interface (SONET/TDM) blocks. This increases device capacity and performance, and permits the integration of the functionality of FIG. 7 into a single integrated circuit device or a multi-chip solution of lower cost and higher performance than prior art solutions.

Figure 7A:
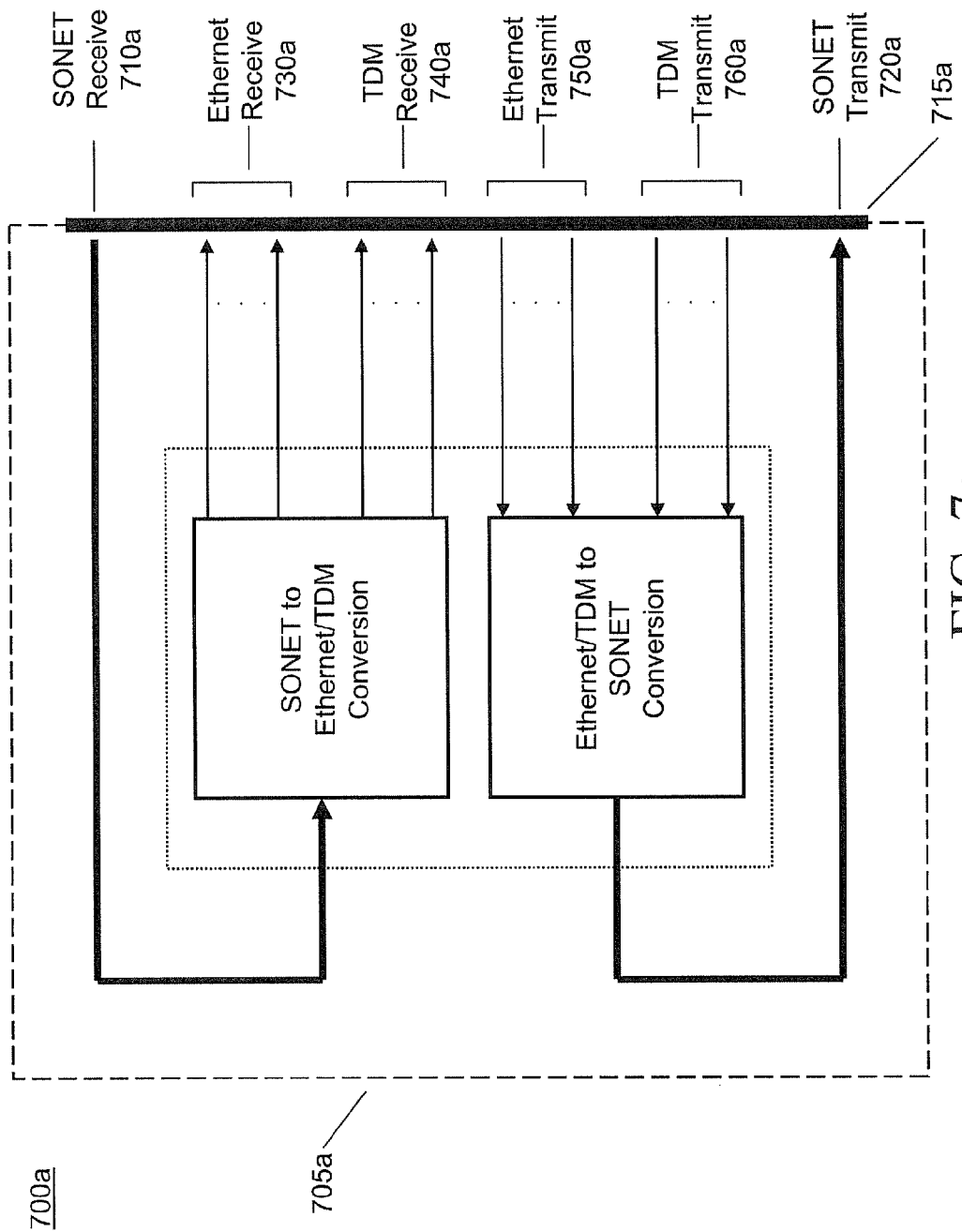
FIG. 7a shows an embodiment of the present invention which is contained within one or more integrated circuits on a single circuit card having a single connector.
Figure 7B:
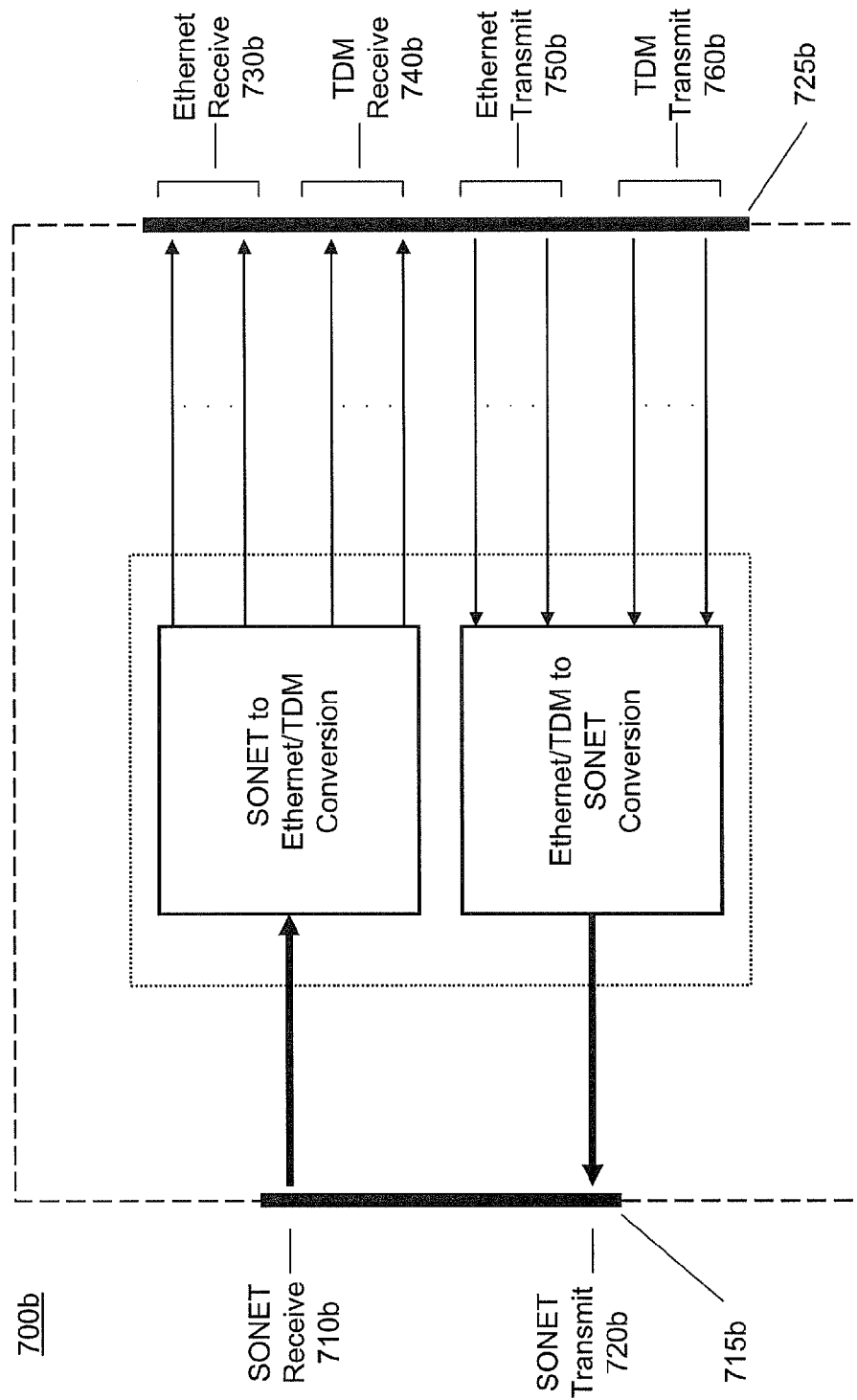
FIG. 7b illustrates an embodiment in accordance with the present invention where the functionality shown in FIG. 7 is incorporated on a single circuit card having two connectors.

FIG. 7a shows an embodiment of the present invention in which the above functionality is contained within one or more integrated circuits on a single circuit card 705a. In such an embodiment, both the SONET and packet data streams are directed through a single connector 715a. The high level of functionality present on circuit card 705a eliminates the need for many other circuit cards in the MSPP 500 of FIG. 5, freeing card slots for additional circuit cards 705a, or for the inclusion of other functionality in MSPP 500. FIG. 7b illustrates another embodiment in accordance with the present invention where the functionality shown in FIG. 7 is incorporated on a single circuit card 705b having two connectors. Connector 715b may, for example, carry SONET receive and transmit signals 710b and 720b, respectively. Connector 725b may, for example, carry Ethernet receive and transmit signals 730b and 740b, respectively, and time division multiplex receive and transmit signals 750b and 760b, respectively. Such an embodiment eliminates the need for the backplane typically present in systems with this level of functionality, and permits the development of a relatively small, SONET-to-Ethernet interface device. Additional details of the functionality that may be present in embodiments such as these follows.

Figure 8:
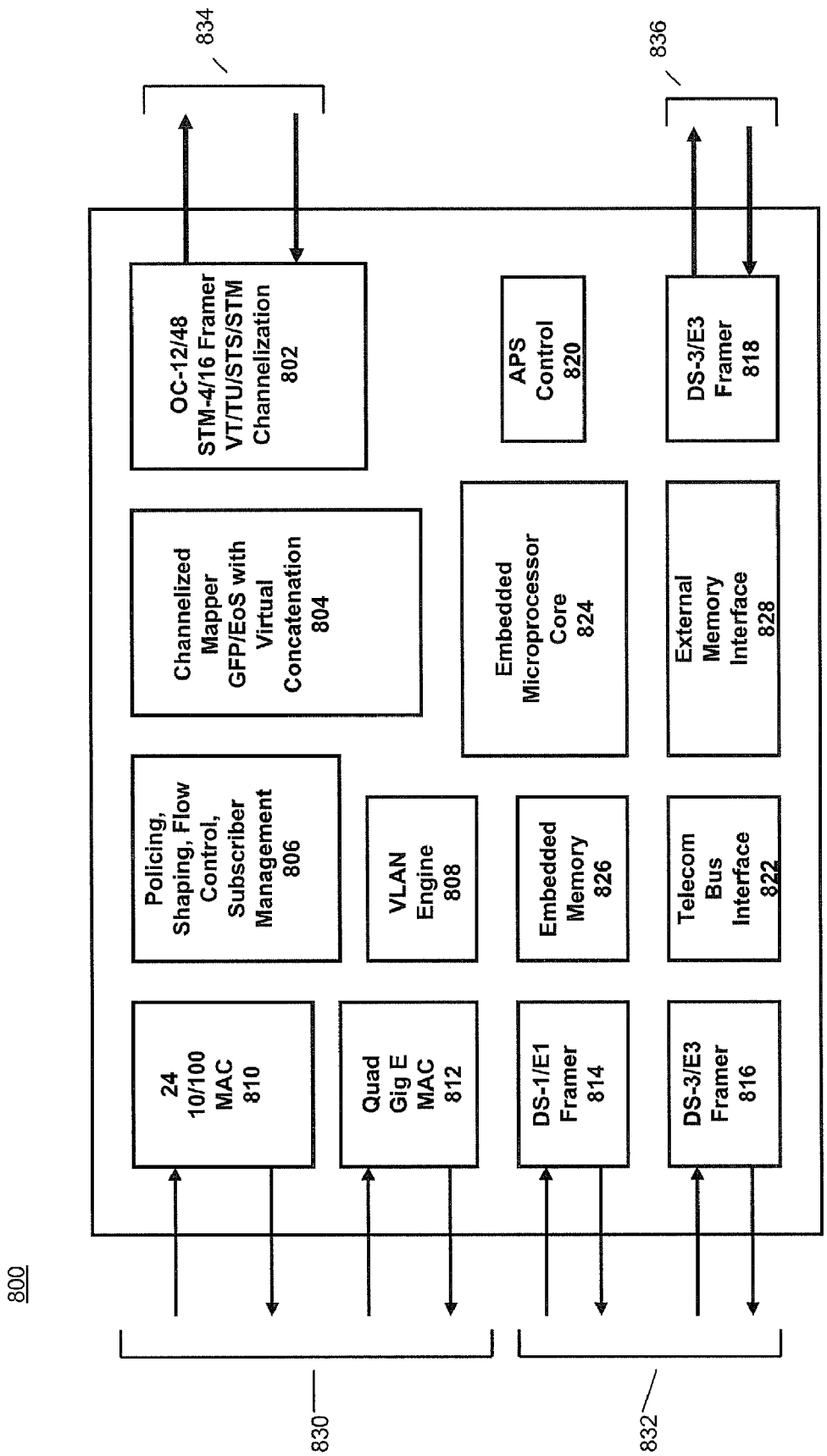
FIG. 8 is a block diagram showing functionality that may be present in one embodiment according to the present invention.

FIG. 8 shows a block diagram illustrating further detail of functionality that may be present in a single-chip embodiment according to the present invention. Such an embodiment may incorporate a channelized framer 802, which may support the Synchronous Optical Network (SONET) and Synchronous Digital Hierarchy (SDH) protocol specifications of optical link 834. The incoming and outgoing paths of optical link 834 of FIG. 8 correspond to, for example, optical links 704 and 715 of FIG. 7, respectively. Channelized framer 802 may support Uni-directional Protected Switched Rings (UPSR) with protected ADM uplinks via OC-12/48 optical lines. In such an arrangement, automatic protection switching (APS) control 820 supports switching from the main to the protection line. An embodiment may also support a Bi-directional Line Switched Ring (BLSR) ring topology. Channelized framer 802 may incorporate a full-capacity, non-blocking Synchronous Transport Signal (STS)/Synchronous Transport Module (STM) and Virtual Tributary (VT)/Tributary Unit (TU) cross-connect which may be used to switch channelized data streams between the optical line 834 and packet mapper 804, subscriber-side DS1/E1 and DS3/E3 framers 814 and 816, and telecom bus interface 822. An embodiment may support complete line and path overhead processing, including full STS/STM and VT/TU pointer processing. In addition, an embodiment may interface with a time-division-multiplexed (TDM) DS3/E3 uplink 836 via DS3/E3 framer 818.

Packet mapper 804 may support virtual concatenation (VC) for compatibility with the installed SONET/SDH network infrastructure, and may enable the use of various traffic segregation methods, for example, stacked virtual local area networks (VLANs), multi-protocol label switching (MPLS) labels, and VT1.5 and/or STS-1 Ethernet-over-SONET (EoS) mapping. Mapping of VLAN/MPLS groups to create a link-layer tunnel that may be supported by VLAN Engine 808. The use of provisioned tunnels with MPLS or VLANs may ensure that the bandwidth provisioned for subscriber access to Internet Protocol (IP) services is maintained, and that high-priority traffic will have the bandwidth resources needed to be passed unconstrained through the network during times of congestion & restoration. In one embodiment, packet mapper 804 may support Ethernet mapping to SONET using, for example, the ANSI T1X1.5 Generic Framing Procedure (GFP), the ITU X.86 EoS recommendation, or the Internet Engineering Task Force (IETF) RFC 1662 point-to-point protocol (PPP) specification. These procedures may be used for the Ethernet-to-SONET mapping functions, while 802.3x may be used for flow control at a subscriber line interface. Internet access traffic may be mapped into a shared concatenated channel, and both high order (STS-1-Xv) and low order (VT1.5-Xv) virtual concatenation may be supported. This capability may enable mapping to a channel of any size with 1.5 Mbps granularity. Each subscriber channel may be mapped to its own SONET channel. The subscriber may have multiple channels per physical port, for example, a private line channel and a channel for Internet access, and may also have multiple private lines on the same port. VLAN/MPLS tags may be mapped to physical ports, via media access control (MAC) addresses as well as logical channels.

Ethernet service on packet links 830 may be 10 megabit per second (Mbps), 100 Mbps, or 1000 Mbps (gigabit) Ethernet (GigE/GbE) connections which may be supported by 10

Mbps/100 Mbps MAC 810 and Gig-E MAC 812. Both MAC 810 and MAC 812 may connect to external physical layer (PHY) interface devices (not shown). Support for TDM DS1/E1 and DS3/E3 interfaces may be provided by DS1/E1 framer 814 and DS3/E3 framer 816 via synchronous connections 832, the specifications of which may be designed to interface with appropriate external physical interface devices (not shown). An embodiment may allow the connection of additional communications interfaces such as additional DS1/E1 or DS3/E3 framers, through the use of telecom bus interface 822. The present invention may support full duplex operation at full rate for all frame sizes for 10BaseT, 100BaseTX, 1000BaseLX/SX. For telephone grade subscriber loop cabling, an Ethernet-to-DSL bridging chip may be used.

An embodiment of the present invention may support services such as Ethernet Private Lines, which provide secure local area network (LAN) interconnections between corporate sites, Internet access over Ethernet physical service links, and packet voice. An embodiment of the present invention may provide support for delay-sensitive traffic, such as IP telephony over Ethernet, which generally requires guaranteed minimum latency. IP-based interoffice telephony allows a single access line for data & interoffice voice, permitting cheaper interoffice voice calls using the IP network. This also allows re-use of an existing private branch exchange (PBX) infrastructure. Access to the public switched telephone network (PSTN) may be possible via a service provider's gateway. In such an arrangement, the subscriber pays only for data access service.

An embodiment of the present invention may support Ethernet private line service, which provides point-to-point transparent transport using Ethernet. Private line service implies that all attributes of the subscriber's Ethernet channel are preserved throughout the transport network, e.g. VLANs, etc. This capability allows a subscriber to connect two corporate LANs together, leveraging the SONET investment by making use of SONET DCS network. Ethernet traffic may be mapped into SONET containers, for example, STS and VT groups using the capabilities of channelized framer 802 and packet mapper 806. The mapping may be transparent. In such an application, privacy is typically of paramount importance.

The present invention may include traffic shaping, which may be supported by the policing, shaping, flow control and subscriber management functionality represented by functional block 806. This functionality may allow Ethernet subscriber ports to be rate limited with a 1 Mbps granularity up to gigabit rate or be shut off entirely, and may permit the service provider to offer Internet access provisioned as metered, tiered or burst-able service. For example, with tiered service the subscriber may choose a specific "capacity tier" to set the maximum allowable capacity they may access. Those limits may be set with, for example, a 10% granularity for 10/100 Ethernet and a 5% granularity for gigabit Ethernet. An embodiment may also allow a service provider to offer metered service in which subscribers pay only for the bandwidth they use on a per-use basis. In such an arrangement, the only bandwidth limit is the port speed (10 Mbps/100 Mbps/GbE). In addition, the service provider may offer "burst-able" service, which may be viewed as a combination of tiered and metered service. With "burst-able" service the subscriber operates within a specific "bandwidth tier", allowing the subscriber to obtain a fixed amount of bandwidth. The allowed bandwidth limit might be set with, for example, a 10% granularity for 10 Mbps/100 Mbps Ethernet and with a 5% granularity for gigabit Ethernet service. The subscriber may then burst at up to the physical port speed.

In addition, the policing, shaping, flow control and subscriber management functionality represented by block 806 may support intelligent traffic shaping, which may guarantee minimum latency for delay-sensitive traffic such as packet voice. The present invention may provide subscriber port shaping/policing capabilities configurable to support IP Differentiated Services Code Point (DSCP) prioritized and/or weighted queuing enabling, for example, eight different link layer traffic priority levels as per 802.1D(p). It may also reprioritize 802.1D(p) priorities in the 802.1Q tag for traffic that exceeds the subscriber's provisioned bandwidth. An embodiment of the present invention may issue PAUSE frames when a subscriber attempts to burst beyond its provisioned bandwidth. However, the present invention may support intelligent traffic shaping that extends the PAUSE frame concept so that only certain flows (e.g. Internet access flows) are throttled. The intelligent traffic shaping approach is in addition to DSCP and 802.1D(p) priorities, because it guarantees a traffic shaping procedure going beyond priorities. This may provide enhanced traffic management, because priorities are irrelevant if the physical port is paused. An embodiment of the present invention may support a policing & congestion control mechanism similar to Frame Relay's Discard Eligible (DE) standard, marking traffic that is above the traffic profile and treating such traffic with a higher discard probability when network congestion occurs. Discretionary traffic shaping may be based on flow/priority type, and may permit traffic shaping at a physical port to be honored as may be required by a service level agreement (SLA). For example, an embodiment in accordance with the present invention may support system performance characteristics that meet the standard service provider's SLA's such as, for example, a one-way delay of 65 msec, data loss of 1%, and 100% availability. The functionality in block 806 supports the reality that some flows, however, should not be shaped. In general, Voice-over-Internet Protocol (VoIP) flows should not be paused, so that minimum latency to the MPLS IP network can be guaranteed for voice connections, for example.

The functionality represented by block 806 may also permit the collection of usage statistics based on class-of-service (CoS)/quality of service (QoS) for network management and SLA conformance purposes. Key benchmarks in such agreements may be latency, latency variation and data loss, and such parameters may be measured by an embodiment of the present invention. Other statistics that may be collected include port, VLAN, and 802.1D(p) traffic statistics, and available resources (bandwidth, buffer space, protection bandwidth, etc). An embodiment may also support the gathering of traffic statistics on subscriber ports independently. This information may be reported to operating personnel or systems at a remote location by embedded microprocessor core 824, using the SONET data communications channel (DCC).

An embodiment of the present invention may protect 100% of allocated subscriber access bandwidth to IP service within the network, and may also provide different levels of protection. In a fiber cut or port failure scenario, the traffic restoration mechanism contained within block 820 may use SONET UPSR ring technology for fault discovery, traffic switchover and alarm propagation. Channelized framer 802 may have, for example, two STS-48 ports to connect either to the ring or to a redundant backplane link. On the subscriber side, an embodiment of the present invention may provision protected links between itself and the CPE. Each subscriber may have, for example, two connections, and the protected connection may switch over if the main connection goes down. Software stored in embedded memory 826 may direct embedded microprocessor core 824 to use VLAN mapping to different 802.1D(p) priorities as a way to protecting subscriber traffic at different levels of protection.

An embodiment of the present invention may support advanced maintenance and operations support functionality, due in part to the immediate and broad access by embedded microprocessor core 824 to status information and operating parameters contained within, for example, channelized framer 802, MACs 810 and 812, packet mapper 804, DS1/DS3 framers 814, 816, and 818, and policing/shaping/flow control/subscriber management functionality 806. To support such functionality, an embodiment of the present invention may provide for creation of a subscriber demarcation point in the same facility as the CPE, and may permit remote loopback at both the line and MAC levels. This capability may enable the monitoring and isolation of physical problems on the subscriber link from a remote location up to the CPE. In addition, MAC 810 and MAC 812 may support time-domain-reflectometry (TDR) functionality on ports to isolate break points for copper-based subscriber loops. Software instructions contained within embedded memory 826 or external memory connected to external memory interface 828 may permit processor 824 to report the illustrated failure conditions, locations, and other diagnostic information to the operator of the system either through control frames (dedicated VLAN) or via the SONET DCC channel. An embodiment may also have the mechanisms to identify and geographically locate network degradation using alarms from the equipment, and may be able to distinguish between layer 0/1 and layer 2 degradation or faults.

An embodiment in accordance with the present invention may include external memory that may be accessed by embedded microprocessor core 824 via external memory interface 828. This functionality may allow software instructions stored in embedded memory 826 or external memory connected to external memory interface 828 to use the SONET DCC channel for remote management & provisioning. Software programs stored in embedded memory 826 may permit embedded microprocessor core 824 to receive via a private Ethernet tunnel in-the-field downloadable software upgrades to be stored in a flash memory connected to external memory interface 828. It will be clear to those skilled in the art that the ability to remotely upgrade software is of great value in operating and maintaining networking equipment. In addition, the instructions for an algorithm comparable to admission control may be contained within embedded memory 826 or external memory connected to external memory interface 828 and implemented by embedded microprocessor core 824, to disallow provisioning changes which would adversely affect customer traffic and/or the level of traffic protection within the network.

Figure 9:
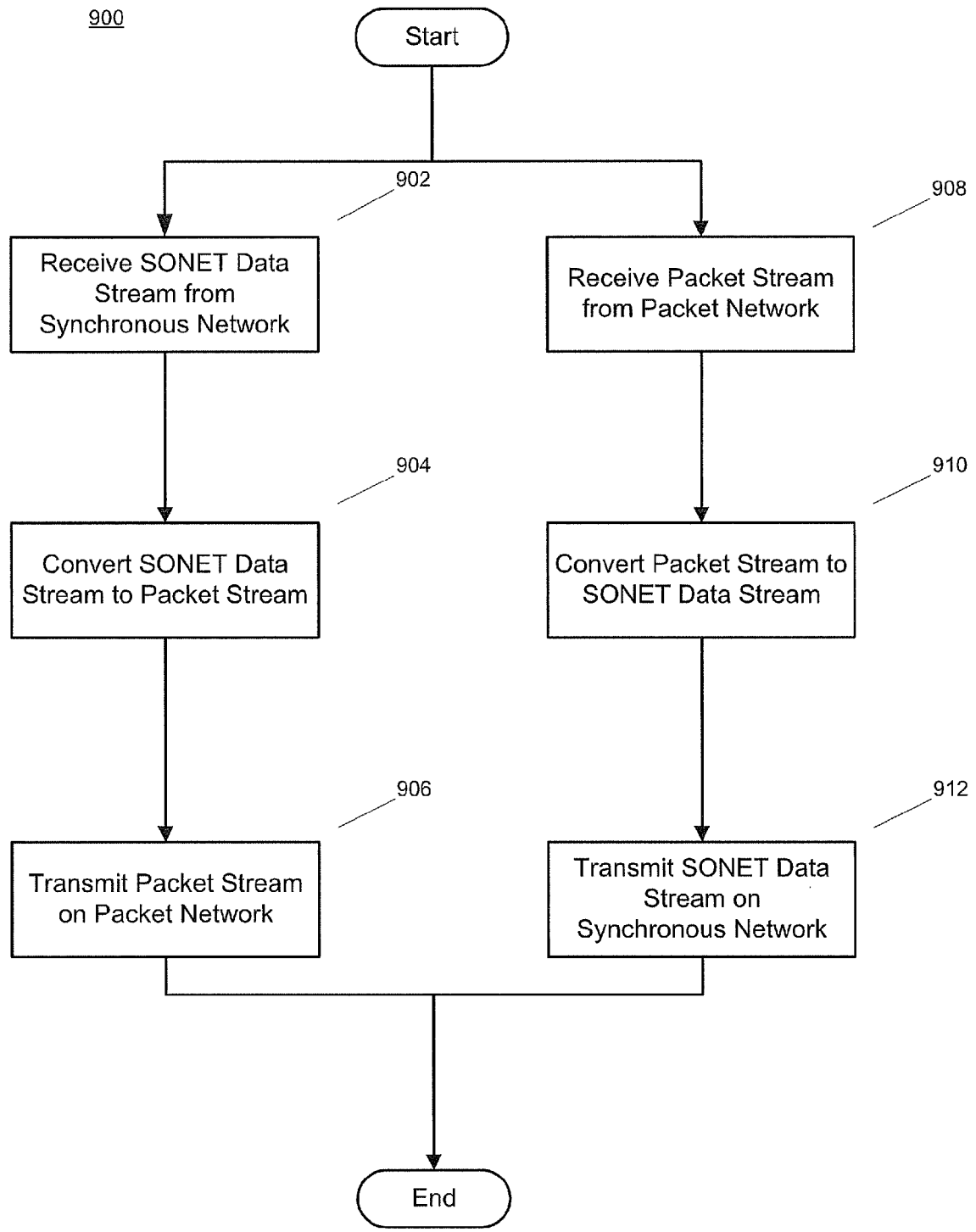
FIG. 9 is a high-level flow diagram showing a method of operating an embodiment of the present invention.

FIG. 9 is a high-level flow diagram of a method of operating an embodiment of the present invention. In such an embodiment, the incoming SONET data stream is received (block 902) from a synchronous optical network, for example, and converted into a packet formatted stream (block 904). The packet stream is then transmitted (block 906) to an Ethernet packet network, for example. In the reverse direction, an incoming packet stream is received (block 908) from an Ethernet packet network, for example, and converted to a SONET compatible format (block 910). The resulting SONET data stream is then transmitted (block 912) to a synchronous optical network, for example.

Figure 10:
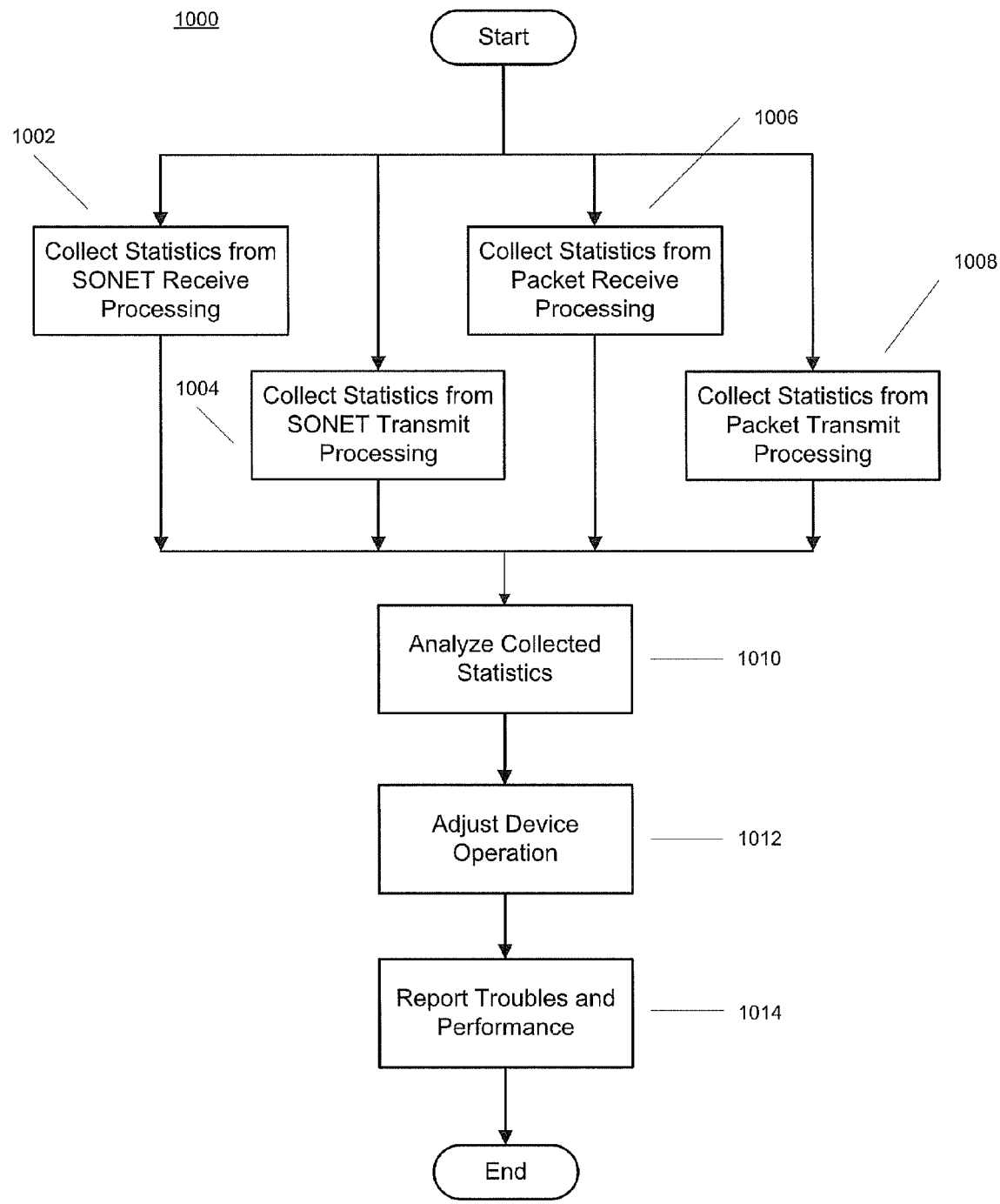
FIG. 10 is a high-level flow diagram illustrating another method of operating an embodiment in accordance with the present invention.

FIG. 10 is a high-level flow diagram of a further method of operating an embodiment according to the present invention. In such an embodiment, embedded microprocessor core 824 of FIG. 8 may collect operational statistics from, for example, the SONET receive processing (block 1002), the SONET transmit processing (block 1004), the packet receive processing (block 1006), and the packet transmit processing (block 1008) functional blocks. The gathered statistics may then be analyzed (block 1010) and embedded microprocessor core 824 may then determine, the actions or adjustments that may be needed for desired system operation. Embedded microprocessor core 824 may then adjust the operation (block 1012) of the functional blocks in the embodiment, and may report troubles and performance (block 1014) to a predetermined location. Many improvements in the level of diagnostics, performance, and control become available by closely integrating the functionality shown in FIG. 7 in the form of, for example, a single chip or multi-chip embodiment.

Accordingly, the present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

Notwithstanding, the invention and its inventive arrangements disclosed herein may be embodied in other forms without departing from the spirit or essential attributes thereof. Accordingly, reference should be made to the following claims, rather than to the foregoing specification, as indicating the scope of the invention. In this regard, the description above is intended by way of example only and is not intended to limit the present invention in any way, except as set forth in the following claims.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A single chip synchronous optical network interface device comprising:
    at least one optical carrier framer for framing a channelized input data stream to produce a transmit data stream for conversion to an optical signal for transmission over an optical network link, and for framing a receive data stream converted from an optical signal received from the optical network link to produce a channelized output data stream;

a cross connect for multiplexing a plurality of input data channels to form the channelized input data stream, and for de-multiplexing the channelized output data stream into a plurality of output data channels;

a packet mapper for packetizing at least one of the plurality of output data channels to produce at least one packet output stream for transmission to user equipment over a packet network, and for de-packetizing at least one packet input stream received from the user equipment over the packet network to produce at least one of the plurality of input data channels;

a bus interface for connecting additional communications interface devices, the bus interface arranged to permit the transfer of data from at least one of the plurality of output data channels to one or more operably coupled communication interface devices located external to the single chip synchronous optical network interface device, and the transfer of data from the one or more operably coupled communication interface devices to at least one of the plurality of input data channels, the communication interface devices processing the data from the at least one of the plurality of output data channels for transmission in a different format over a communication link and processing data received in the different format from the communication link for transmission using the at least one of the plurality of input data channels; and at least one embedded microprocessor core that is operable to automatically adjust operation of the single chip synchronous optical network interface device according to operational statistics collected from one or both of the at least one optical carrier framer and the packet mapper, wherein the at least one embedded microprocessor core is arranged to isolate break points in a subscriber loop using time domain reflectometry.

2. The single chip synchronous optical network interface device of claim 1, wherein a format of the transmit data stream and the receive data stream is compatible with the Synchronous Optical Network or Synchronous Digital Hierarchy optical carrier standard.

3. The single chip synchronous optical network interface device of claim 1, wherein the bus interface employs Telecom Bus Interface signaling.

4. The single chip synchronous optical network interface device of claim 1 further comprising at least one TIE carrier framer for receiving and transmitting data in time division multiplexed formal.

5. The single chip synchronous optical network interface device of claim 4 wherein the at least one TIE carrier framer is a DS1 or E1 format framer.

6. The single chip synchronous optical network interface device of claim 4 wherein the at least one TIE carrier framer is a DS3 or E3 format framer.

7. The single chip synchronous optical network interface device of claim 1 wherein a packet format of the at least one packet output stream and the at least one packet input stream of the packet mapper is compliant with at least one the Institute of Electrical and Electronic Engineers 802.3 family of Ethernet standards available on or before Oct. 21, 2002.

8. The single chip synchronous optical network interface device of claim 1 wherein the packet mapper is compatible with the American National Standards Institute T1X1.5 Generic Framing Procedure available on or before Oct. 21, 2002.

9. The single chip synchronous optical network interface device of claim 1 wherein the packet mapper is compatible with the International Telecommunications Union X.86 Ethernet over SONET recommendation available on or before Oct. 21, 2002.

10. The single chip synchronous optical network interface device of claim 1 wherein the packet mapper is compatible with the Internet Engineering Task Force RFC 1662 point-to-point protocol specification.

11. The single chip synchronous optical network interface device of claim 1 further comprising at least one embedded microprocessor core arranged in order receive signals from the packet mapper.

12. The single chip synchronous optical network interface device of claim 11, further comprising an embedded memory for storing information to be accessed by the at least one embedded microprocessor core.

13. The single chip synchronous optical network interface device of claim 11 further comprising an external memory interface arranged to allow the at least one embedded microprocessor core to access information stored in at least one memory device external to the single chip synchronous optical network device.

14. The single chip synchronous optical network interface device of claim 1, wherein the at least one embedded microprocessor core is arranged to report operational statistics of the single chip synchronous optical network interface device over the optical network link.

15. The single chip synchronous optical network interface device of claim 1, wherein the one or more operably coupled communication interface devices comprise a framer for receiving and transmitting data in time division multiplexed formal.

16. A system for use in a synchronous optical network interface device, the system comprising:

one or more circuits comprising at least one embedded microprocessor core, the one or more circuits operably coupled to at least one optical network link and at least one packet network link, the one or more circuits operable to, at least:

receive a first synchronous optical network compatible data stream from the at least one optical network link;

convert the first synchronous optical network compatible data stream to a first packet stream;

transmit the first packet stream to user equipment over the at least one packet network link;

receive a second packet stream from the user equipment over the at least one packet network link;

convert the second packet stream to a second synchronous optical network compatible data stream;

transmit the second synchronous optical network compatible data stream over the at least one optical network link;

transfer data from the first synchronous optical network compatible data stream to one or more operably coupled communications interface devices located external to the synchronous optical network interface device, and transfer data from the one or more operably coupled communication interface devices for transmission using the second synchronous optical network compatible data stream, the communication interface devices processing the data from the first synchronous optical network compatible data stream for transmission in a different format over a communication link and processing data received in the different format from the communication link for transmission using the first synchronous optical network compatible data stream; and receive updates to executable program code of the at least one embedded microprocessor core, over the at least one optical network link, wherein the executable program code is operable to collect, analyze, and report operational statistics of the synchronous optical network interface device to a location remote from the synchronous optical network interface device, using the at least one optical network link, wherein the at least one embedded microprocessor core is arranged to isolate break points in a subscriber loop using time domain reflectometry.

17. The system of claim 16, wherein the at least one optical network link comprises a synchronous digital hierarchy (SOH) link.

18. The system of claim 17, wherein the at least one packet network link comprises an Ethernet link.

19. The system of claim 17, wherein the one or more operably coupled communications interface devices communicate with the synchronous optical network interface device using Telecom Bus Interface signaling.

20. A system for use in a synchronous optical network interface device, the system comprising:
one or more circuits comprising at least one embedded microprocessor core, the one or more circuits operably coupled to at least one optical network link and at least one packet network link, the one or more circuits operable to, at least:
channelize a receive data stream from the optical network link to produce a channelized output data stream;
de-multiplex the channelized output data stream to produce at least one output data channel;
packetize the at least one output data channel to produce a packet output stream for transmission over at least one packet network link to user equipment;
de-packetize a packet input stream received from the user equipment using the at least one packet network link to produce at least one input data channel;
multiplex the at least one input data channel to produce a channelized input data stream;
frame the channelized input data stream to produce a transmit data stream for transmission over the at least one optical network link; and
collect at least one operational statistic for at least one of the channelizing, de-multiplexing, packetizing, de-packetizing, multiplexing, and framing actions;
wherein the device is operable to transfer data from the receive data stream over a bus interface to one or more operably coupled communications interface devices located external to the synchronous optical network interface device, and to transfer data from the one or more operably coupled communication interface devices over the bus interface for transmission using the transmit data stream, the communication interface devices processing the data from the receive data stream for transmission in a different format over a communication link and processing data received in the different format from the communication link for transmission using the transmit data stream; and
wherein the at least one embedded microprocessor core is operable to analyze the at least one operational statistic, adjust operation of the device responsive to the analysis, and report performance to a location remote from the device using the at least one optical network link, wherein the at least one embedded microprocessor core is arranged to isolate break points in a subscriber loop using time domain reflectometry.

21. The system of claim 20, wherein the formats of the transmit data stream and the receive data stream are compatible with the Synchronous Optical Network or Synchronous Digital Hierarchy optical carrier standard.

22. The system of claim 20, wherein a packet format of the packet output stream and packet input stream is compliant with at least one the Institute of Electrical and Electronic Engineers 802.3 family of Ethernet standards available on or before Oct. 21, 2002.

23. The system of claim 20 wherein the multiplexing and de-multiplexing is compatible with the American National Standards Institute T1X1.5 Generic Framing Procedure available on or before Oct. 21, 2002.

24. The system of claim 20 wherein the multiplexing and de-multiplexing is compatible with the International Telecommunications Union X.86 Ethernet over SONET recommendation available on or before Oct. 21, 2002.

25. The system of claim 20 wherein the packetization and the de-packetization is compatible with the Internet Engineering Task Force RFC 1662 point-to-point protocol specification.

26. The system of claim 20, wherein the one or more circuits are operable to, at least, monitor the receive data stream for at least one predetermined data sequence requesting acceptance of an update to executable code of the at least one embedded microprocessor core.

27. The system of claim 20, wherein the one or more operably coupled communication interface devices comprise a framer for receiving and transmitting data in time division multiplexed formal.

28. The system of claim 20, wherein the one or more operably coupled communications interface devices communicate with the synchronous optical network interface device using Telecom Bus Interface signaling.

* * * * *